United States Patent [19]

Franz

[11] 4,053,567
[45] Oct. 11, 1977

[54] ALUMINUM AND MAGNESIUM PERCHLORATE-HYDRAZINE COMPLEXES

[75] Inventor: Gerhard Franz, Toms River, N.J.

[73] Assignee: Allied Chemical Corporation, Morris Township, N.J.

[21] Appl. No.: 450,576

[22] Filed: Apr. 21, 1965

[51] Int. Cl.² .............................................. C01B 21/20
[52] U.S. Cl. ........................................ 423/386; 149/36
[58] Field of Search ................. 149/36, 75; 23/85, 91, 23/92, 356, 190, 52; 423/386

[56] References Cited

U.S. PATENT DOCUMENTS

| 3,167,386 | 1/1965 | McElroy et al. ................... 149/75 X |
| 3,205,103 | 9/1965 | Zhivadinovich et al. ............. 149/75 |

OTHER PUBLICATIONS

Encyclopedia of Explosives and Related Items, vol. 2, p. c184, 1960.

*Primary Examiner*—Leland A. Sebastian
*Attorney, Agent, or Firm*—Jay P. Friedenson; Robert A. Harman

EXEMPLARY CLAIM

1. A compound of the formula $$Al(ClO_4)_3 \cdot [Mg(ClO_4)_2]_x \cdot yN_2H_4$$

wherein $x$ is a member selected from the group consisting of 0 and 1, $y$ is a member selected from the group consisting of 6 and 8 and when $x$ is 0, $y$ is 6; when $x$ is 1, $y$ is 8.

16 Claims, No Drawings

ALUMINUM AND MAGNESIUM PERCHLORATE-HYDRAZINE COMPLEXES

This invention relates to novel perchloratehydrazine complexes of aluminum and magnesium and more particularly relates to hexahydrazinum aluminum-(III)-perchlorate ($Al(ClO_4)_3 \cdot 6N_2H_4$) and octahydrazinium aluminum-(III), magnesium-(II)-perchlorate ($Al(ClO_4)_3 \cdot Mg(ClO_4)_2 \cdot 8N_2H_4$) and to processes for making the same. These compounds are useful as high-energy oxidizers and as monopropellants.

In accordance with the invention, it has been found that the novel ($Al(ClO_4)_3 \cdot 6N_2H_4$ and $Al(ClO_4)_3 \cdot Mg(ClO_4)_2 \cdot 8N_2H_4$ complexes may be prepared by precipitating these substances from anhydrous $Al(ClO_4)_3$ and mixtures of anhydrous $Al(ClO_4)_3$ and anhydrous $Mg(ClO_4)_2$, respectively, with hydrazine. The anhydrous materials may be prepared by dehydrating the corresponding hydrous materials (viz. $Al(ClO_4)_3 \cdot 9H_2O$ and $Mg(ClO_4)_2 \cdot 6H_2O$) with 2,2'-dimethoxypropane.

General practice of the invention process, as illustrated by the preparation of $Al(ClO_4)_3 \cdot 6N_2H_4$, comprises dissolving $Al(ClO_4)_3 \cdot 9H_2O$ in 2,2'-dimethoxypropane, stirring the resulting mixture to obtain a solution containing aluminum perchlorate in anhydrous form and then adding hydrazine to the solution containing the anhydrous aluminum perchlorate in an amount sufficient to precipitate the desired $Al(ClO_4)_3 \cdot 6N_2H_4$ compound. The reactions involved may be illustrated as follows:

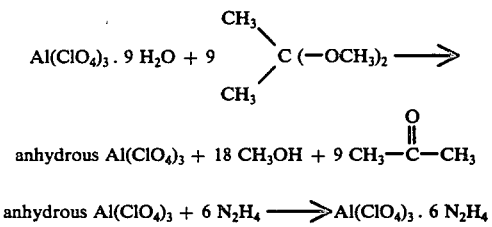

anhydrous $Al(ClO_4)_3$ + 18 $CH_3OH$ + 9 $CH_3-\overset{O}{\overset{\|}{C}}-CH_3$   I anhydrous $Al(ClO_4)_3$ + 6 $N_2H_4 \longrightarrow Al(ClO_4)_3 \cdot 6 N_2H_4$   II When the $Al(ClO_4)_3 \cdot Mg(ClO_4)_2 \cdot 8N_2H_4$ complex is desired, a mixture of anhydrous aluminum and magnesium perchlorates is prepared and the composite anhydrous solution is then reacted with hydrazine as described above.

The starting materials and reactants are all commercially available. As anhydrous magnesium perchlorate is available commercially, such material can be conveniently used in place of the hydrous magnesium perchlorate. When mixed with the hydrous aluminum perchlorate component; this will of course result in a smaller requirement of dehydrating agent. Although all of the starting materials and reactants may be used as found in technical grade; it has been found that increased yields and better quality products are obtained when the 2,2'-dimethoxypropane and hydrazine reactants are freshly distilled prior to use. This may be accomplished in any conventional manner. It has been found, for example, that 2,2'-dimethoxypropane may be conveniently and effectively distilled from a solution of sodium-benzophenone and that hydrazine may be conveniently and effectively distilled over NaOH.

Although both the dehydration and precipitation reactions can be carried out in an atmosphere of ordinary air; in order to favor increased yields and higher quality product, the reactions may be carried out in as water-free an atmosphere as is feasible. This may be accomplished readily by merely drying the air in the reaction vessel, or by carrying out the reaction in an inert atmosphere, such as one consisting essentially of helium, argon, nitrogen, or the like.

Apparatus employed in the practice of the invention is simple and may include any reactor suitable for facilitating contacting and mixing of liquid reactants. As the reactants and products are not particularly corrosive, construction of the reaction vessel may be of ordinary materials such as glass or steel. The apparatus is conveniently furnished with suitable accessories arranged to provide for mixing of the contents of the reactor and changing the temperature of said contents as indicated herein. The apparatus may further be equipped with valved outlets through which, during a reaction run, liquid product may be drawn off and product separated therefrom. A product recovery system may include a drying tube or vacuum desiccator. In general, apparatus suitable for practice of a preferred embodiment of the invention may be of the type indicated in the appended examples.

In practice of the invention, the desired proportions of 2,2'-dimethoxypropane and the hydrous perchlorate, or perchlorate mixture, are charged to a suitable reaction vessel which has been provided with an inert atmosphere, as above described. The resulting colorless solution is stirred until it turns red. The red solution contains the perchlorates in an anhydrous form. A sufficient amount of hydrazine is then added to the red solution to precipitate the desired complexes, which then may be separated by conventional means.

Since the water of hydration of the $Al(ClO_4)_3 \cdot 9H_2O$ starting material reacts quantitatively with 2,2'-dimethoxypropane to form the dehydrated product, methanol and acetone, as indicated in equation 1, supra; the minimal amount of 2,2'-dimethoxypropane required is that stoichiometric amount required to completely dehydrate the amount of $Al(ClO_4)_3 \cdot 9H_2O$ charged to the reaction vessel. This amounts to 9 moles of 2,2'-dimethoxypropane per mole of $Al(ClO_4)_3 \cdot 9H_2O$. If the hydrous $Mg(ClO_4)_2 \cdot 6H_2O$ material is also charged to the reaction vessel, a corresponding stoichiometric amount needed to completely dehydrate this material, or in other words 6 moles of 2,2'-dimethoxypropane per mole of $Mg(ClO_4)_2 \cdot 6H_2O$, will of course be additionally required.

Although the minimal stoichiometric amounts of 2,2'-dimethoxypropane may be used, or a slight excess in order to insure complete dehydration; it has been found that it is advantageous to employ a large excess of this material. A large excess of 2,2'-dimethoxypropane serves as a solvent and facilitates subsequent reaction with hydrazine and working up of the reaction products. For this purpose, the excess of 2,2'-dimethoxypropane reagent employed is expediently anywhere from about 5-20 times the minimal stoichiometric amount required for reaction.

The amount of hydrazine required to precipitate desired product from the anhydrous perchlorate, or perchlorate mixture is the stoichiometric amount. In the case of the $Al(ClO_4)_3 \cdot 6N_2H_4$ product, 6 moles of $N_2H_4$ per mole of $Al(ClO_4)_3$ are required; for the $Al(ClO_4)_3 \cdot Mg(ClO_4)_2 \cdot 8N_2H_4$ product, 8 moles of $N_2H_4$ per (combined) mole of $Al(ClO_4)_3 \cdot Mg(ClO_4)_2$ are required. In actual practice, however, $N_2H_4$ will merely be added in an amount sufficient to effect precipitation. Addition of an excess of $N_2H_4$ will have no adverse effects upon the reaction.

There is no particular criticality in operating temperatures for either of the dehydration step or the precipitation step, room temperatures (about 20° C.) being most expedient and quite satisfactory. It has been found, however, that precipitation from the anhydrous perchlorate or perchlorate mixture solution may be most efficiently accomplished if the solution containing the anhydrous material is cooled below room temperature. Any reduction in temperature below room temperature will assist in precipitation and temperatures as lows as $-20°$ C. or below, may be employed. Ice-bath temperatures (about 0° C.) are most easily obtainable, however, and produce excellent results.

Reaction times, for each of the dehydration and precipitation steps, are relatively short and are determined by the formation of a red solution, as described above, in the former step and by the formation of a white precipitate in the latter step.

The $Al(ClO_4)_3 \cdot 6N_2H_4$ and $Al(ClO_4)_3 \cdot Mg(ClO_4)_2 \cdot 8N_2H_4$ products are both white precipitates and may be recovered by conventional means, such as by filtration. The solid material may then be purified, such as by washing with absolute ether and drying under vacuum.

The following illustrate practice of the invention.

EXAMPLE 1

200 cc. (1.92 moles) of 2,2'-dimethoxypropane, freshly distilled from sodium-benzophenone, together with 6.5 g. (0.013 mole) of $Al(ClO_4)_3 \cdot 9H_2O$ were charged to a 500 ml. round bottomed flask, which flask was provided with an argon atmosphere, a magnetic stirrer and means for administering an ice-bath to the lower portion of the flask. The mixture formed a colorless solution and was stirred for about 8 hrs. Approximately 15 minutes after the combination of the 2,2'-dimethoxypropane and $Al(ClO_4)_3 \cdot 9H_2O$ ingredients and commencement of the stirring, the colorless solution turned yellowish and about 1 hour later the yellowish solution turned wine-red. The wine-red solution was cooled, by means of the ice-bath, to about 0° C. At this time, 6 cc. (.187 mole) of freshly distilled hydrazine ($N_2H_4$) were added dropwise to the solution with stirring. After the addition of approximately two thirds of the hydrazine, the solution became colorless and a yellow-white solid precipitated. At this point, 200 cc. of absolute ether was added and the contents of the flask were stirred for an additional 15 minutes. At the end of this period, the precipitate was separated by filtration which was carried out in a sintered-glass crucible (coarse). The yellowish-white solid, so separated, was washed several times with small portions of absolute ether until this material was completely white and the ether washing solution, colorless. The filtrate was found to contain 2,2'-dimethoxypropane, acetone and methanol. The separated white solid material was dried under high vacuum for about 2 hours. The white solid, which was in the form of free-flowing crystals, did not lose $N_2H_4$ until the crystals were heated above about 50° C. The white crystalline product was identified by elemental analysis as being $Al(ClO_4)_3 \cdot 6N_2H_4$. Chlorine was determined as AgCl after combustion of the compound in a Parr-bomb. Hydrazine was determined by titration with an iodine solution. Total nitrogen was obtained by the micro-Dumas method. Aluminum was precipitated with 8-hydroxyquinoline and weighed. Hydrogen was determined conventionally. Results of the analysis were as follows:

|  | Al | Cl | N | H | Ratio Al : Cl : N |  |  |
|---|---|---|---|---|---|---|---|
| Calculated | 5.2 | 20.5 | 32.4 | 4.7 | 1: | 3 : | 12 |
| Found | 4.8 | 18.2 | 32.0 | 3.6 | 1: | 2.88 : | 12.8 |

An X-ray powder photograph confirmed a crystalline structure for this compound.

EXAMPLE 2

50 cc. (.48 mole) of freshly distilled 2,2'-dimethoxypropane, 2.4 g. (0.005 mole) of $Al(ClO_4)_3 \cdot 9H_2O$ and 1.24 g. (0.005 mole) of anhydrous $Mg(ClO_4)_2$ were charged to a 500 cc. round bottomed flask, which flask was provided with an inert atmosphere of argon, a magnetic stirrer and means for administering an ice-bath to the lower portion of the flask. The mixture formed a colorless solution and was stirred for a period of about 3 hours. During the course of the mixing, the solution turned yellowish and then to wine-red. At the end of the mixing period, the wine-red solution was cooled, by means of the ice-bath, to about 0° C. At this time 3.0 cc. (0.1 mole) of freshly distilled hydrazine were added dropwise to the solution, with stirring. A white solid precipitated after the addition of approximately two thirds of the hydrazine. The solid was filtered off and washed and dried, as described in above Example 1. The white solid material, which was in the form of free flowing crystals, was identified by elemental analysis, as described in above Example 1, as being $Al(ClO_4)_3 \cdot Mg(ClO_4)_2 \cdot 8N_2H_4$. The results of the analysis are as follows:

|  | Al | Mg | Cl | N | H |
|---|---|---|---|---|---|
| Calculated | 3.3 | 3.0 | 22.0 | 28.1 | 4.0 |
| Found | 3.5 | 3.0 | 19.0 | 28.7 | 3.8 |

An X-ray powder photograph of the $Al(ClO_4)_3 \cdot Mg(ClO_4)_2 \cdot 8N_2H_4$ product indicated a uniform crystalline structure and confirmed the expectation that this material exists as a distinct chemical compound and not a mere physical mixture of two or more other chemical compounds.

It is well known that perchlorates, generally, are good high-energy oxidiers for a number of common fuel-binder systems. Specific impulse calculations for a number of fuel-binder systems, using $Al(ClO_4)_3$ as the oxidizer, indicate that this material is no exception. With $AlH_3$ as the fuel and polyurethane as the binder, the calculated maximum I.s.p. (shifting equilibrium, 1000/14.7 psia.) for aluminum perchlorate is 245 seconds. Substitution of $LiAlH_4$ for $AlH_3$ as the fuel, will result in an increase in I.s.p. value, to about 270 seconds. Calculations indicate that use of the novel perchlorate complexes, viz. $Al(ClO_4)_3 \cdot 6N_2H_4$ or $Al(ClO_4)_3 \cdot Mg(ClO_4)_2 \cdot 8N_2H_4$, as oxidizers in the above-described fuel-binder systems, will add about 20–25 seconds to the I.s.p. value. Accordingly, I.s.p. values in the neighborhood of about 270–295 seconds for propellant compositions, using $AlH_3$ or $LiAlH_4$ as the fuel, polyurethane as the binder and $Al(ClO_4)_3 \cdot 6N_2H_4$ or $Al(ClO_4)_3 \cdot Mg(ClO_4)_2 \cdot 8N_2H_4$ as the oxidizer, can be expected. Moreover, the latter compounds possess a high density, good thermal stability and relatively low shock sensitivity which properties render such compounds especially suitable for use as high-energy oxidizers or monopropellants.

I claim:

1. A compound of the formula

wherein $x$ is a member selected from the group consisting of 0 and 1, $y$ is a member selected from the group consisting of 6 and 8 and when $x$ is 0, $y$ is 6; when $x$ is 1, $y$ is 8.

2. The compound $Al(ClO_4)_3 \cdot 6N_2H_4$

3. The compound $Al(ClO_4)_3 \cdot Mg(ClO_4)_2 \cdot 8N_2H_4$

4. The method of preparing anhydrous $Al(ClO_4)_3$ which comprises mixing $Al(ClO_4)_3 \cdot 9H_2O$ and 2,2'-dimethoxypropane.

5. The method of preparing $Al(ClO_4)_3 \cdot 6N_2H_4$ which comprises precipitating said composition from anhydrous $Al(ClO_4)_3$ with hydrazine.

6. The method of preparing $Al(ClO_4)_3 \cdot Mg(ClO_4)_2 \cdot 8N_2H_4$ which comprises precipitating said composition from a mixture of anhydrous $Al(ClO_4)_3$ and anhydrous $Mg(ClO_4)_2$ with hydrazine.

7. The method of preparing $Al(ClO_4)_3 \cdot 6N_2H_4$ which comprises the steps of mixing $Al(ClO_4)_3 \cdot 9H_2O$ and 2,2'-dimethoxypropane to form anhydrous $Al(ClO_4)_3$ and reacting hydrazine with said anhydrous $Al(ClO_4)_3$ to precipitate $Al(ClO_4)_3 \cdot 6N_2H_4$.

8. The process of claim 7 in which both steps are carried out in an inert atmosphere.

9. The method of preparing $Al(ClO_4)_3 \cdot Mg(ClO_4)_2 \cdot 8N_2H_4$ which comprises the steps of mixing $Al(ClO_4)_3 \cdot 9H_2O$, $Mg(ClO_4)_2 \cdot 6H_2O$ and 2,2'-dimethoxypropane to form a mixture of anhydrous $Al(ClO_4)_3$ and anhydrous $Mg(ClO_4)_2$ and reacting hydrazine with said anhydrous mixture to precipitate $Al(ClO)_4)_3 \cdot Mg(ClO_4)_2 \cdot 8N_2H_4$.

10. The process of claim 9 wherein anhydrous $Mg(ClO_4)_2$ is used in place of $Mg(ClO_4)_2 \cdot 6H_2O$.

11. The process of claim 9 in which both steps are carried out in an inert atmosphere.

12. The method of preparing $Al(ClO_4)_3 \cdot 6N_2H_4$ which comprises carrying out the following steps in an inert atmosphere:
 a. dissolving $Al(ClO_4)_3 \cdot 9H_2O$ in an excess of 2,2'-dimethoxypropane to form a mixture containing anhydrous $Al(ClO_4)_3$,
 b. cooling the mixture to about 0° C. and
 c. adding sufficient hydrazine to the anhydrous $Al(ClO_4)_3$ mixture to precipitate $Al(ClO_4)_3 \cdot 6N_2H_4$.

13. The process of claim 12 in which the inert atmosphere consists essentially of argon.

14. The method of preparing $Al(ClO_4)_3 \cdot Mg(ClO_4)_2 \cdot 8N_2H_4$ which comprises carrying out the following steps in an inert atmosphere:
 a. dissolving $Al(ClO_4)_3 \cdot 9H_2O$ and $Mg(ClO_4)_2 \cdot 6H_2O$ in an excess of 2,2'-dimethoxypropane to form a mixture containing anhydrous $Al(ClO_4)_3$ and anhydrous $Mg(ClO_4)_2$,
 b. cooling the mixture to about 0° C. and
 c. adding sufficient hydrazine to the anhydrous mixture to precipitate $Al(ClO_4)_3 \cdot Mg(ClO_4)_2 \cdot 8N_2H_4$.

15. The process of claim 14 wherein anhydrous $Mg(ClO_4)_2$ is used in place of $Mg(ClO_4)_2 \cdot 6H_2O$.

16. The process of claim 15 wherein the inert atmosphere consists essentially of argon.

* * * * *